United States Patent
Ishikawa et al.

(10) Patent No.: US 8,514,684 B2
(45) Date of Patent: Aug. 20, 2013

(54) MULTILAYER OPTICAL DISC FOR EASY POSITIONING OF A FOCUSED BEAM

(75) Inventors: Yoshinori Ishikawa, Yokohama (JP); Harukazu Miyamoto, Higashimurayama (JP); Akemi Hirotsune, Odawara (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/207,146

(22) Filed: Aug. 10, 2011

(65) Prior Publication Data

US 2011/0299374 A1   Dec. 8, 2011

Related U.S. Application Data

(63) Continuation of application No. 12/598,682, filed as application No. PCT/JP2008/054305 on Mar. 10, 2008.

(30) Foreign Application Priority Data

Jun. 1, 2007   (JP) .................................. 2007-146435

(51) Int. Cl.
*G11B 7/24* (2006.01)
*G11B 7/09* (2006.01)

(52) U.S. Cl.
USPC ........................................ 369/94; 369/47.45

(58) Field of Classification Search
USPC .......... 369/44.23, 44.26, 44.27, 44.32, 47.36, 369/47.38–47.4, 47.45, 47.55, 53.11–53.14, 369/53.2, 53.22, 53.23, 53.37, 94, 275.1–275.5, 369/280, 283, 286, 275.1–275.5; 428/64.1–65.2; 720/718–724

See application file for complete search history.

(56) References Cited

U.S. PATENT DOCUMENTS

| | | | |
|---|---|---|---|
| 4,450,553 A * | 5/1984 | Holster et al. | 369/275.5 |
| 6,574,174 B1 * | 6/2003 | Amble et al. | 369/44.26 |
| 7,143,426 B2 | 11/2006 | Mishima et al. | |
| 7,567,493 B2 | 7/2009 | Hong et al. | |
| 7,842,366 B2 | 11/2010 | Ichimura | |
| 7,907,497 B2 | 3/2011 | Nakano et al. | |
| 2004/0139459 A1 | 7/2004 | Mishima et al. | |

(Continued)

FOREIGN PATENT DOCUMENTS

| | | |
|---|---|---|
| CN | 1909086 A | 2/2007 |
| JP | 2001-155380 A | 6/2001 |

(Continued)

OTHER PUBLICATIONS

Machine-Assisted Translation of JP 2001155380 A.*

(Continued)

*Primary Examiner* — Nathan Danielsen
(74) *Attorney, Agent, or Firm* — McDermott Will & Emery LLP

(57) ABSTRACT

A multilayer optical disc which has three or more recording layers and enables easy positioning of a focused beam spot onto a particular recording layer in which a BCA is disposed. An inter-layer distance between a particular recording layer and a recording layer adjacent to the particular recording layer is larger than the other inter-layer distances in which, at the focused beam spot positioning, the focused beam spot traverses the said adjacent recording layer earlier than the other recording layer adjacent to the particular recording layer.

4 Claims, 4 Drawing Sheets

(56) References Cited

U.S. PATENT DOCUMENTS

| | | |
|---|---|---|
| 2004/0253539 A1 | 12/2004 | Uno et al. |
| 2006/0038875 A1 | 2/2006 | Ichimura |
| 2006/0120229 A1 | 6/2006 | Nabeta |
| 2006/0251850 A1 | 11/2006 | Ootera et al. |
| 2007/0041295 A1 | 2/2007 | Sugaya et al. |
| 2007/0070843 A1 | 3/2007 | Kobayashi |
| 2009/0034388 A1 | 2/2009 | Nakano et al. |

FOREIGN PATENT DOCUMENTS

| | | |
|---|---|---|
| JP | 2006-059433 | 3/2006 |
| JP | 2006-155792 | 6/2006 |
| JP | 2006-313585 A | 11/2006 |
| JP | 2006-351120 A | 12/2006 |
| WO | WO 2007/004373 A1 | 1/2007 |

OTHER PUBLICATIONS

US Office Action issued in U.S. Appl. No. 12/598,682, dated Sep. 20, 2011.
Chinese Office Action, with English translation, issued in Chinese Patent Application No. 200880014993.0, dated Sep. 13, 2010.
Mishima, K., et al., "150 GB, 6-Layer Write Once Disc for Blu-ray Disc System", 2006, IEEE.
Entire Prosecution of U.S. Appl. No. 12/598,682 to Ishikawa, et al., filed on Apr. 14, 2010, entitled "Multiplayer Optical Disc.".
Japanese Notice of Reasons for Rejection issued in Japanese Patent Application No. JP 2007-146435 dated Jul. 27, 2010.
Supplementary European Search Report, issued in European Patent Application No. EP 08 72 1721, issued on Dec. 14, 2010.
Extended European Search Report, issued in European Patent Application No. 12 155 414.1, dated May 3, 2012.
Mishima, et al., "150 GB, 6-layer write once disc for Blu-ray Disc system", Proc. of SPIE, 2006, 11 pages, vol. 6282.
United States Office Action issued in U.S. Appl. No. 12/598,682 dated Feb. 16, 2012.
Chinese Office Action with English Translation issued in Chinese Application No. 200510028419.9 mailed Oct. 30, 2012.
United States Office Action issued in U.S. Appl. No. 12/598,682 dated Aug. 20, 2012.
Japanese Office Action in issued in Japanese Application No. 2011-251220 dated May 21, 2013.

* cited by examiner

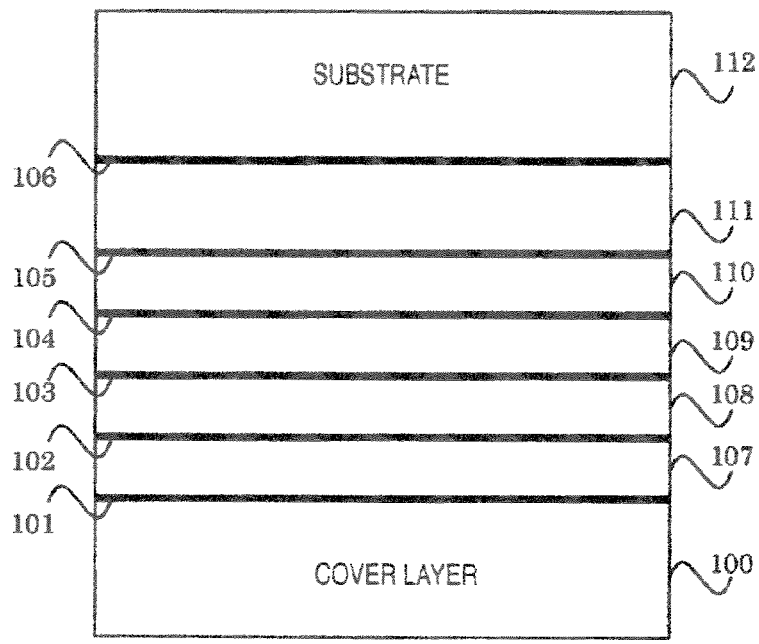
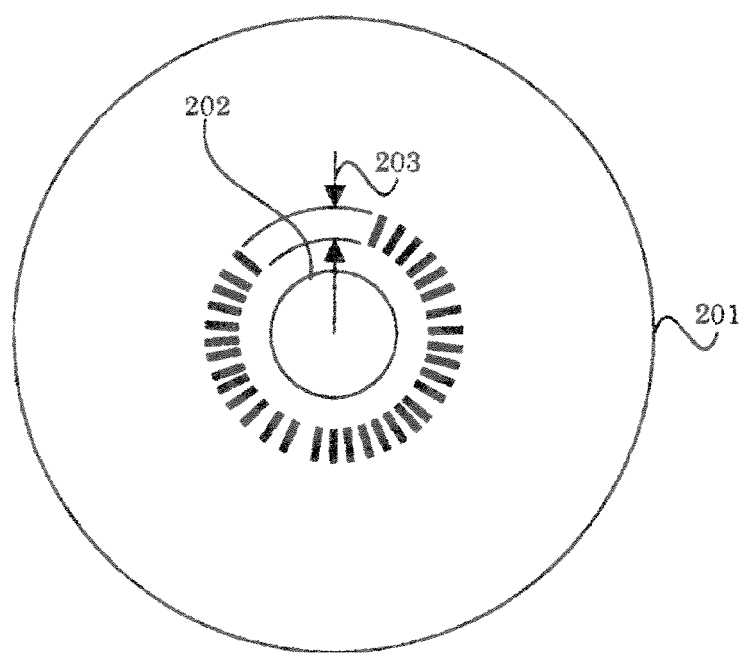

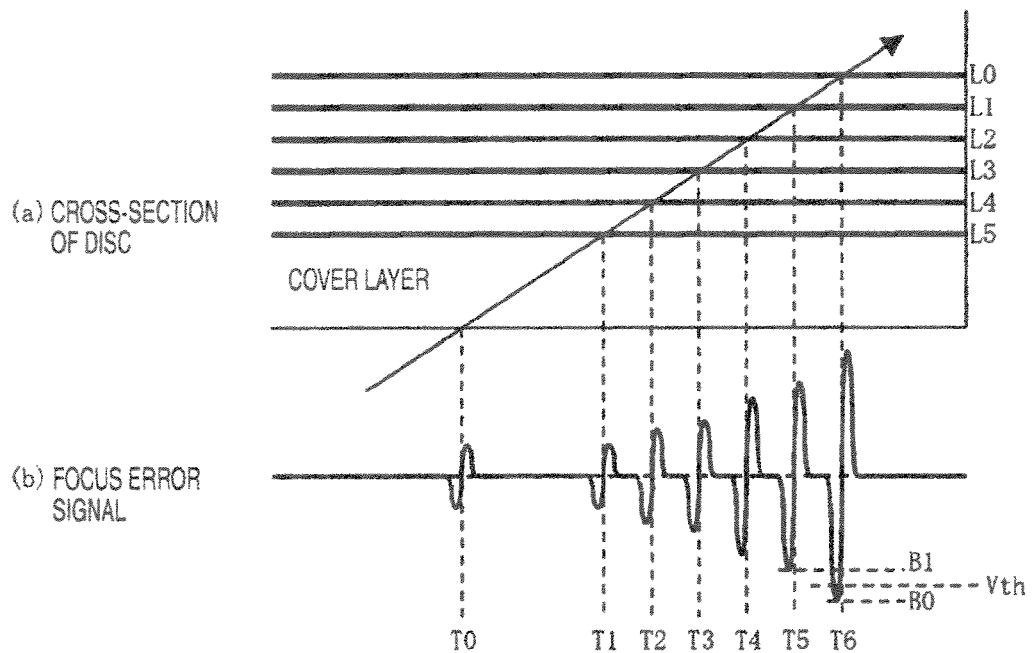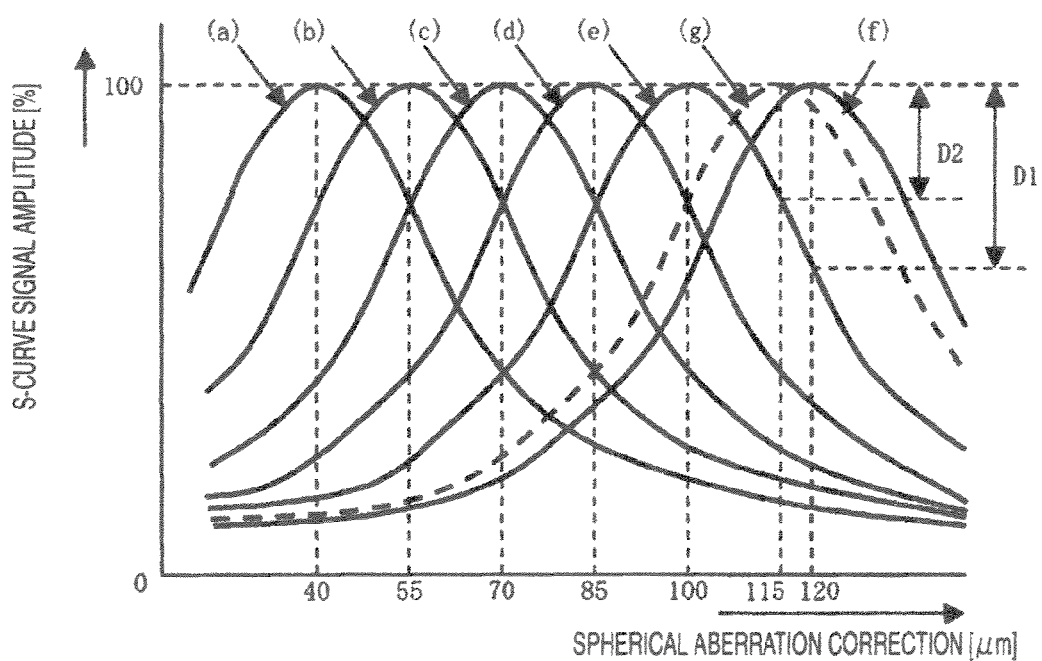

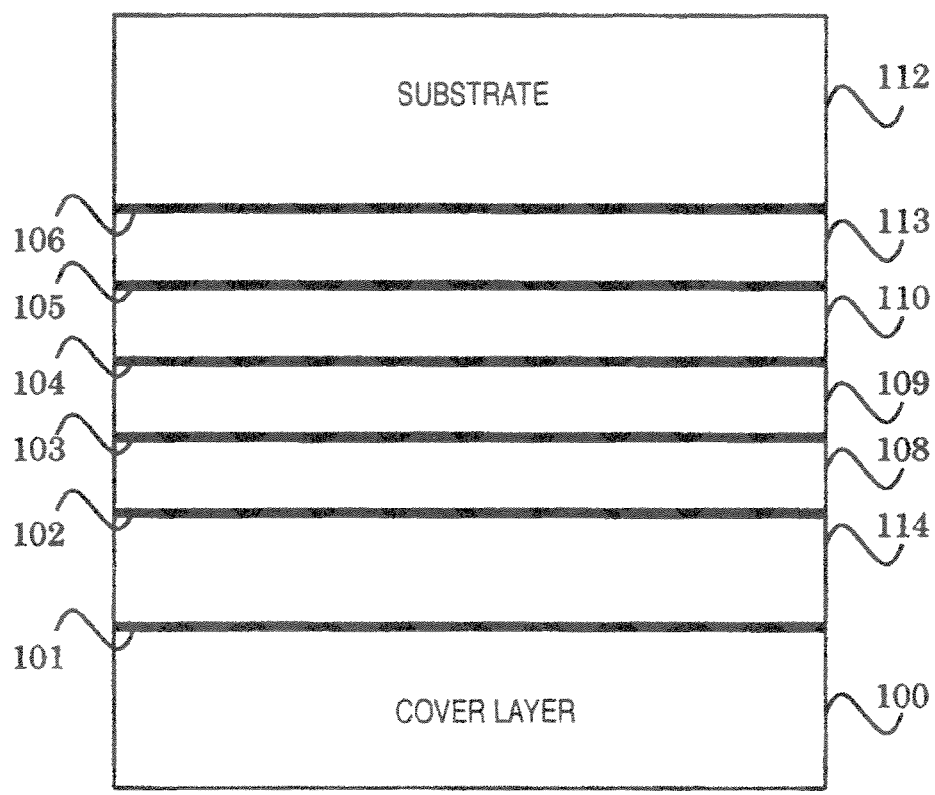

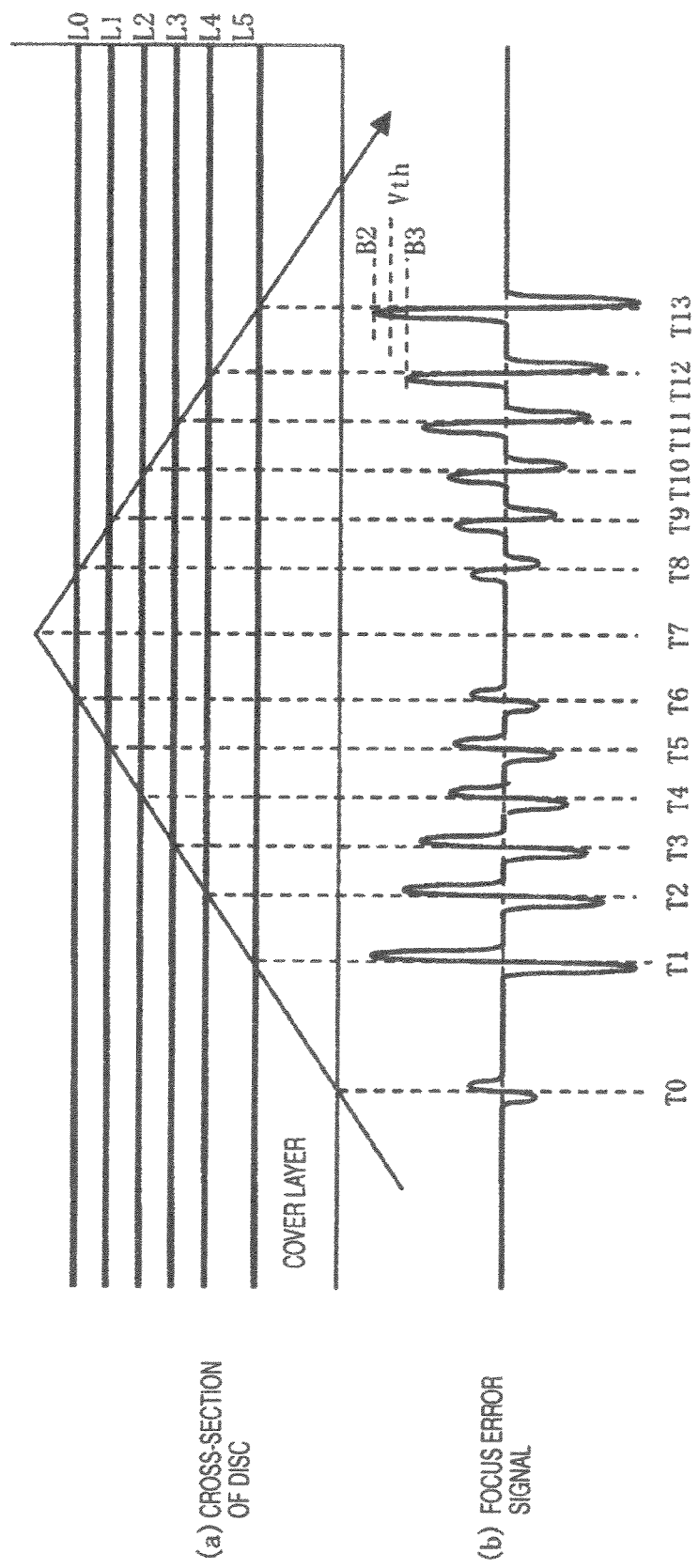

MULTILAYER OPTICAL DISC FOR EASY POSITIONING OF A FOCUSED BEAM

INCORPORATED BY REFERENCE

This application is a Continuation of U.S. application Ser. No. 12/598,682, filed on Apr. 14, 2010, which is the U.S. National Phase under 35 U.S.C. §371 of International Application No. PCT/JP2008/054305, filed on Mar. 10, 2008, which in turn claims the benefit of Japanese Application No. 2007-146435, filed on Jun. 1, 2007, the entire contents of each of which are hereby incorporated by reference.

TECHNICAL FIELD

The present invention relates to multilayer optical discs having three or more recording layers.

BACKGROUND ART

As measures to increase the storage capacity of an optical disc, there have been known use of laser beams having a shorter wavelength for recording/reproduction of data, reduction of the size of laser beam spots by the use of objective lenses having a higher numerical aperture, use of multilayer discs having plural recording layers, and others. As for the multilayer disc, two-layered discs have already been put into practical use for the DVDs and Blu-ray discs (hereafter, referred to as "BD").

Recently, optical discs having three or more recording layers have been proposed, and specifically, BDs having six recording layers have been proposed (see, for example, ODS2006 Technical digest (2006)041).

DISCLOSURE OF INVENTION

Here, consideration will be given to a recording layer onto which a focused beam spot is to be first positioned.

The two-layered BD has a recording layer called L0, which is at a depth of 100 μm from a disc surface on which a laser beam is to be incident for recording/reproduction of information, and the other recording layer called L1, which is at a depth of 75 μm from the disc surface. The BCA (Bust Cutting Area) code including DI (Disc Information) carrying information on the disc category, etc. is disposed in the recording layer L0.

FIG. 2 is a diagrammatic view of an optical disc having a BCA.

Referring to FIG. 2, an optical disc 201 has a hole 202 formed at a center of the disc for use in the mounting of the disc, and a BCA 203 is disposed around the hole 202. With the optical disc 201 being rotated, by operating a focusing servo onto the recording layer L0 of the disc at the diametrical position of the BCA, levels of light reflected from the disc 201 will produce a bar code data containing a repetition of high and low intensities. This bar code data represents a BCA code including the DI.

For reading out the BCA code, the focusing servo has only to be performed, while the tracking servo is unnecessary therefor. The optical disc apparatus discriminates, by the use of levels of reflection signals or the like, in which category of medium among such as BD-ROM, BD-R, etc. a mounted optical disc is, with the final determination of the medium category being carried out by referring to the DI recorded in advance in the optical disc 201. In order to complete the determination of the category of medium in a short time, it is necessary to position the focused beam spot onto a recording layer where the BCA 203 is disposed, i.e., onto a recording layer in which information to be first reproduced is recorded. Therefore, it is desirable that, with a two-layered BD, the optical disc apparatus should first position the focused beam spot onto the recording layer L0 of the disc.

With respect to the six-layered BD, since no standards have been established yet therefor, it is unknown in which of the layers the BCA or a similar one should be disposed. Assuming that the conventional approach is taken, it is conjectured that the BCA or the like may be disposed in the recording layer L0 in the six-layered BD disclosed in the above-mentioned literature which layer is located the deepest in the BD. In that case, it is desirable that an optical disc apparatus supporting six-layered BDs should first position the focused beam spot onto the deepest located recording layer L0, i.e., onto the recording layer in which information to be first reproduced is recorded.

An object of the present invention is to a multilayer optical disc having three or more recording layers in which it is possible to easily position a focused beam spot onto a recording layer in which information to be first reproduced is recorded.

An object of the present invention may be, for example, accomplished by adjusting distances between each of recording layers in which information to be first reproduced is recorded and other recording layers adjacent thereto.

According to the present invention, in a multilayer optical disc having three or more recording layers, it is possible to easily position a focused beam spot onto a recording layer in which information to be first reproduced is recorded.

BEST MODE FOR CARRYING OUT THE INVENTION

Embodiments of the present invention will be described hereinafter.

[Embodiment 1]

Embodiment 1 of the present invention will now be described.

With reference to the diagrammatic view of FIG. 3, an operation of positioning a focused beam spot and signal waveforms will be explained in connection with a six-layered BD. In FIG. 3, it is assumed that the mechanism for the spherical aberration correction provided in the optical disc apparatus is adjusted in advance so as to assume an optimum with respect to the recording layer L0.

In FIG. 3, view (a) shows a cross section of a six-layered BD in which the arrow represents a locus of a laser beam spot when an objective lens is moved upward for the positioning of a focused beam spot, while view (b) conceptually shows a focus error (hereafter, referred to as "FE") signal in which a well-known S-curve signal zero-crossing at time T0 appears when the laser beam spot traverses the disc surface. With the objective lens being further moved up, another S-curve signal zero-crossing at time T1 appears on the FE signal when the laser beam spot traverses the recording layer L5. In the similar manner, S-curve signals appear at times T2, T3, T4, T5 and T6 on the FE signal when the laser beam spot traverses the recording layers L4, L3, L2, L1 and L0, respectively.

It is known that a multilayer optical disc suffers spherical aberration problems stemming from differences between distances between the disc surface on which a laser beam for recording/reproducing information is incident and the respective recording layers so that the amplitudes of S-curve signals corresponding to the respective recording layers are different. For example, in FIG. 3, since the aberration correction has been set so as to be optimum with respect to the recording layer L0, the amplitude of the S-curve signal corresponding to the recording layer L0 is larger than those of the S-curve signals corresponding to the other recording layers. Since the aberration correction with respect to the recording layer L1 is deviated from the optimum value, the amplitude of the S-curve signal corresponding to the recording layer L1 is smaller than that of the S-curve signal corresponding to the recording layer L0. In the similar manner, the amplitudes of the S-curve signals on the FE signal corresponding to the recording layers L2, L3, L4 and L5 are becoming smaller as they are farther from the recording layer L0.

Owing to this phenomenon, as shown in FIG. 3, it is possible to accurately position the focused beam spot onto the recording layer L0 by establishing a detection level Vth between the bottom peak levels B1 and B0 of the respective S-curve signals corresponding to the recording layers L1 and L0, and detecting a zero-crossing of the FE signal after the FE signal has exceeded the detection level Vth.

In order to adopt the above approach, it is indispensable that the S-curve signal amplitude corresponding to the recording layer L0 in which the BCA is disposed is the largest. However, the S-curve signal amplitudes of the respective recording layers may be varied due to the reflectivities of the respective recording layers and errors in the spherical aberration correction, which may lead to problems such that the bottom level of the S-curve signal corresponding to a recording layer other than the layer L0 exceeds the detection level Vth or the bottom level of the S-curve signal corresponding to the recording layer L0 does not exceed the detection level Vth. Therefore, to solve such problems, it is necessary to provide an optical disc in which the S-curve signal amplitude corresponding to the recording layer L0 is the largest.

FIG. 1 is a diagrammatic sectional view of a six-layered optical disc according to Embodiment 1 of the present invention.

Reference numeral 100 represents a cover layer having a thickness of 40 µm and made of a transparent resin or the like.

Reference numerals 101 to 106 represent recording layers L5, L4, L3, L2, L1 and L0, respectively. It is assumed that all of these recording layers have the same reflectivity. Each of the recording layers is made of a phase-change material or an organic material and is in a lamination structure. However, since such lamination structure does not have to do with this embodiment, description thereof will be omitted.

Reference numerals 107 to 111 represent space layers. The space layers 107 to 110 have a thickness of 15 µm, while the space layer 111 has a thickness of 20 µm. Each of the space layers is made of a transparent resin.

Reference numeral 112 represents a substrate made of a polycarbonate or the like.

Further, the overall thickness of the optical disc including the cover layer 100 to the substrate 112 is 1.2 mm.

The laser beam for recording/reproducing information is incident on the cover layer 100.

The optical disc according to this embodiment is featured in that the space layer 111 has a thickness larger than those of the other space layers. Resultant effects will be described with reference to FIG. 4.

FIG. 4 is a diagrammatic view showing relations between the corrections of spherical aberration and the S-curve signal amplitudes on the FE signal. In FIG. 4, curve (a) is obtained by plotting the S-curve signal amplitudes corresponding to the recording layer L5 with changes of the spherical aberration correction. Since the distance from the disc surface to the recording layer L5 is 40 µm, its optimum spherical aberration correction is 40 µm, with which the S-curve signal amplitude is maximum. Curve (b) is obtained by plotting the S-curve signal amplitudes corresponding to the recording layer L4 with changes of the spherical aberration correction. Since the distance from the disc surface to the recording layer L4 is 55 µm which is a sum of the thicknesses of the cover layer 100 and the space layer 107, its optimum spherical aberration correction is 55 µm, with which the S-curve signal amplitude is maximum. Likewise, curves (c), (d), (e) and (f) are obtained by plotting the S-curve signal amplitudes corresponding to the recording layers L3, L2, L1 and L0, respectively, with changes of the spherical aberration correction. The S-curve signal amplitudes corresponding to these recording layers are maximum with their spherical aberration corrections of 70 µm, 85 µm, 100 µm and 120 µm, respectively, which are equal to the distances from the disc surface to the respective recording layers.

In this connection, since the reflectivities of the respective recording layers are the same, as mentioned above, and the maximum values of the respective S-curve signal amplitudes are equal to one another, the maximum amplitude value is assumed to be 100%.

When the spherical aberration correction with respect to the recording layer L0 is 120 µm, the difference between the S-curve signal amplitudes corresponding to the recording layers L0 and L1 corresponds to D1 in FIG. 4. Thus, the level difference between the bottom levels B1 and B0 of the S-curve signals shown in FIG. 3 corresponds to about one-half of the above-mentioned difference D1.

A comparison of effects will now be made between this embodiment and a case where this embodiment is not applied. As an example of the case in which the present embodiment is not applied, it is presumed that the space layer 111 between the recording layers L1 and L0 is 15 µm which is equal to the thicknesses of the other space layers. The relation between the spherical aberration correction and the S-curve signal amplitude plotted under these conditions is represented by dotted curve (g) in FIG. 4. With the space layer 111 having a thickness of 15 µm, the thickness as measured from the disc surface to the recording layer L0 is 115 µm, and therefore, the curve (g) is maximum when the spherical aberration correction is 115 µm. In this case, the difference between the S-curve signal amplitudes corresponding to the recording layers L0 and L1 will correspond to D2 as in FIG. 4.

As is clear from FIG. 4, the S-curve signal amplitude difference D1 according to this embodiment is greater than the S-curve signal amplitude difference D2 in the case to which this embodiment is not applied. This means that the difference between the bottom levels B1 and B0 in FIG. 3 is made larger with a result that it is possible to increase the margin for the threshold level Vth for the respective bottom levels B0 and B1. As a result, even though the S-curve signal amplitudes on the FE signal are varied due to errors in the reflectivities of the recording layers L0 and L1 or errors in the thickness of the space layer 111, it will no longer occur that the bottom level B0 of the S-curve signal in FIG. 3 is higher than the threshold level Vth or the bottom level B1 of the S-curve signal in FIG. 3 is lower than the threshold level Vth. Thus, it is possible to accurately detect the S-curve signal corresponding to the recording layer L0 by means of the threshold level Vth, which in turn makes it possible to correctly position a focused beam spot onto a desired recording layer L0.

In Embodiment 1 of the present invention described above, it contemplates making the thickness of the space layer 111 between the particular recording layer L0 onto which to position a focused beam spot and the recording layer L1 larger than the thicknesses of the other space layers to thereby increase the bottom level difference between the focus S-curve signals corresponding to the recording layers L0 and L1. By this, the optical disc apparatus is capable of accurate detection of the S-curve signal corresponding to the recording layer L0 with a result that correct positioning of a focused beam spot onto the intended recording layer L0 becomes possible.

Although in Embodiment 1 above, a structure is described in which a BCA is disposed in the recording layer L0, the recording layer in which to dispose a BCA is not limited thereto. For example, a BCA may be disposed in the recording layer L2, and in that case the intended layer onto which to position a focused beam spot will be L2. In that case, the thickness of the space layer 109 between the recording layers L2 and L3 should be made larger than the thicknesses of the other space layers, whereby accurate positioning of a focused beam spot on the recording layer L2 is possible in the same manner as in the operation described above.

[Embodiment 2]

In the structure of the six-layered optical disc according to Embodiment 1, a BCA is disposed in the recording layer L0. However, the BCA may be disposed in the recording layer L5.

Further, in the description of Embodiment 1, positioning of a focused beam spot is carried out by moving the objective lens upward. Meanwhile, it is known that, in order to avoid collision of the objective lens with the disc surface in case of failure in the focused beam spot positioning, the objective lens is once moved upward to such an extent that a laser beam spot have traversed all of the recording layers and thereafter, to attain the focused beam spot positioning, the objective lens is moved downward.

In Embodiment 2, a multilayer optical disc will be described in which a BCA is disposed in the recording layer L5 in a six-layered optical disc, and with this multilayer optical disc it possible to accurately position a focused beam spot onto the recording layer L5 in the course of the above-mentioned downward focused beam spot positioning.

FIG. 5 is a diagrammatic cross-sectional view of a six-layered optical disc according to Embodiment 2 of the present invention. Constituent elements similar to those in FIG. 1 are represented by the same reference numerals and description thereof will be omitted.

Reference numerals 113 and 114 represent space layers. The space layer 113 is 15 μm thick, while the space layer 114 is 20 μm thick.

As in Embodiment 1, the overall thickness of the optical disc including the cover layer 100 to the substrate 112 is 1.2 mm, and the laser beam is incident on the cover layer 100.

The optical disc according to this embodiment is featured in that the space layer 114 has a thickness larger than those of the other space layers. Resultant effects will be described with reference to FIG. 6. Since the various members shown in FIG. 6 are similar to those shown in FIG. 3, description thereof will be omitted.

The optical disc apparatus has been adjusted in advance so that the spherical aberration correction assumes an optimum with respect to the recording layer L5. Under this condition, when an objective lens is moved upward, the laser beam spot traverses the disc surface at time T0, and further traverses the recording layers L5, L4, L3, L2, L1 and L0 at times T1, T2, T3, T4, T5 and T6, respectively, as shown in FIG. 6. At time T7 which is later than the time of traversal of the recording layer L0 by the laser beam spot, the objective lens is changed over to an downward movement, so that the objective lens moving downward traverses the recording layers L0, L1, L2, L3, L4 and L5 at times T8, T9, T10, T11, T12 and T13, respectively.

In accordance with the operation of the objective lens described above, as the laser beam spot traverses the respective recording layers, S-curve signals appear on the FE signal. Here, since the spherical aberration correction has been set so as to be optimum with respect to the recording layer L5, which is a target for the focused beam spot positioning, the S-curve signal amplitudes at the traversal of the recording layer L5 at times T1 and T13 are maximum.

Here, in Embodiment 2, since the thickness of the space layer 114 between the recording layers L5 and L4 is larger than those of the other space layers, owing to the functional effect similar to that described above with reference to FIG. 4 in connection with Embodiment 1, the difference between the top level B3 of the S-curve signal corresponding to the recording layer L4 appearing around time T12 and the top level of B2 of the S-curve signal corresponding to the recording layer L5 appearing around time T13 is made larger with a result that it is possible to increase the margin for the threshold level Vth for the respective bottom levels B2 and B3. As a result, even though the S-curve signal amplitudes on the FE signal are varied due to errors in the reflectivities of the recording layers L5 and L4 or errors in the thickness of the space layer 114, it will no longer occur that the top level B2 of the S-curve signal in FIG. 6 is lower than the threshold level Vth or the top level B3 of the S-curve signal in FIG. 6 is higher than the threshold level Vth. Thus, it is possible to accurately detect the S-curve signal corresponding to the recording layer L5 by means of the threshold level Vth, which in turn makes it possible to correctly position a focused beam spot onto the particular recording layer L5, provided that the focus servo loop is turned on at time T13 when the FE signal zero-crosses after the S-curve signal corresponding to the recording layer L5 has been detected.

In Embodiment 2 of the present invention described above, it contemplates making the thickness of the space layer 114 between the particular recording layer L5 onto which to position a focused beam spot and the recording layer L4 larger than the thicknesses of the other space layers to thereby increase the top level difference between the focus S-curve signals corresponding to the recording layers L5 and L4. By this, the optical disc apparatus is capable of accurate detection of the S-curve signal corresponding to the recording layer L5 with a result that correct positioning of a focused beam spot onto the intended recording layer L5 is possible.

Although in Embodiment 2 above, a structure is described in which a BCA is disposed in the recording layer L5, the recording layer in which to dispose a BCA is not limited thereto. For example, a BCA may be disposed in the recording layer L3, and in that case the intended layer onto which to position a focused beam spot will be L3. In that case, the thickness of the space layer 109 between the recording layers L2 and L3 should be made larger than the thicknesses of the other space layers, whereby correct positioning of a focused beam spot on the recording layer L3 is possible in the same manner as in the operation described above.

In Embodiment 1 and Embodiment 2, the cover layer is 40 μm thick and the respective space layers are 15 μm or 20 μm thick. However, the thicknesses of the layers should not be limited thereto, and they may be optionally determined so as to provide desirable disc recording/reproducing performances.

Further, in Embodiment 1 and Embodiment 2, six-layered optical discs are described by way of example, but there is no need to say that the teaching of the present invention is also applicable to multilayer optical discs having three or more layers.

Further, in Embodiment 1 and Embodiment 2, recordable multilayer discs are described, but the teaching of the present invention is also applicable to read-only multilayer optical discs.

Further, in Embodiment 1 and Embodiment 2, a structure is described in which the disc category information is contained in a BCA code, but there is no need to place the limitation to BCA as long as the disc category information is involved.

Although the present invention has been described with respect to some embodiments, it is evident to those skilled in the art that the present invention should not be restricted thereto and various changes and modifications are possible within the spirit of the present invention and the appended claims.

BRIEF DESCRIPTION OF THE DRAWINGS

FIG. 1 is a sectional view of a six-layered optical disc showing Embodiment 1 of the present invention.

FIG. 2 is a diagrammatic view of an optical disc having a BCA.

FIG. 3 is a diagrammatic view of a focus error signal waveform observed when an objective lens is moved upward.

FIG. 4 is a diagrammatic view showing relations between the corrections of spherical aberration and the focusing S-curve signal amplitudes.

FIG. 5 is a sectional view of a six-layered optical disc showing Embodiment 2 of the present invention.

FIG. 6 is a diagrammatic view showing a focus error signal waveform observed when an objective lens is moved upward and downward.

The invention claimed is:

1. A multilayer optical disc having three or more recording layers having a structure in which:
reflectance of each of the recording layers including transmission through interlayer between recording layers is substantially constant, both a first recording layer in which information to be first reproduced has been stored and a second recording layer adjacent to the first recording layer being provided, wherein:
an interlayer distance between the first recording layer and the second recording layer is larger than any other interlayer distance by more than 5 µm, and
each of the other interlayer distances is 15 to 20 µm.

2. The multilayer optical disc according to claim 1, wherein the second recording layer is close to a disc surface on which a laser beam for recording/reproducing information is to be incident than the first recording layer.

3. The multilayer optical disc according to claim 1, wherein the second recording layer is further from a disc surface on which a laser beam for recording/reproducing information is to be incident than the first recording layer.

4. A focus drawing method for irradiation of a laser beam to a multilayer optical disc having a three or more recording layers, thereby recording/reproducing information, the multilayer optical disc having a structure in which reflectance of each of the recording layers including transmission through interlayers is substantially constant, both a first recording layer in which information to be first reproduced has been stored and a second recording layer adjacent to the first recording layer being provided, an interlayer distance between the first recording layer and the second recording layer being larger than other interlayer distance by more than 5 µm, and each of the other interlayer distances being 15 to 20 µm, comprising the steps of:
correcting a spherical aberration at the first recording layer;
traversing an objective lens in a direction of thickness of the multilayer optical disc;
detecting a focus error signal in each of the layers of the multilayer optical disc; and
drawing a focus to the first recording layer based on the focus error signal.

* * * * *